United States Patent Office 2,777,855
Patented Jan. 15, 1957

2,777,855
AMIDES OF HYDROXYBENZOTRIAZOLE CARBOXYLIC ACIDS

Mario Scalera, Somerville, and Frederic Henry Adams, Bound Brook, N. J., assignors to American Cyanamid Company, New York, N. Y., a corporation of Maine No Drawing. Application December 1, 1954,
Serial No. 472,528

20 Claims. (Cl. 260—308)

The present invention relates to aromatic amides of 5-hydroxy-1,2,3-benzotriazole carboxylic acids in which the carboxy group is bound to a carbon adjacent to that to which the hydroxy group is bound. The simple amides of this type have the general formula

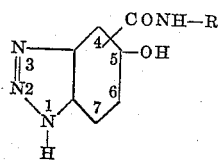

in which R is an aromatic radical, and in which the carbonyl group is in position ortho to the hydroxy substituent. The formula also illustrates the numbering of the molecule.

The amides of our invention may be prepared from the corresponding hydroxy benzotriazole carboxylic acids, which acids are described and claimed in our copending application, Serial Number 248,656, filed September 27, 1951, now U. S. Letters Patent No. 2,700,669, of which this application is a continuation-in-part. The preparation is carried out by treating a mixture of the acid and an aromatic amine, in an inert solvent, with phosphorus trichloride. The process does not require critically controlled conditions and proceeds smoothly with good yields. This type of process is not, in itself, new, but has been used to prepare arylides of other carboxylic acids. Either of the acids described in the above-identified application, the 5-hydroxybenzo-1,2,3-triazole-4-carboxylic acid or the 5-hydroxybenzo-1,2,3-triazole-6-carboxylic acid can be used.

A wide variety of aromatic amines can be used to prepare the amides of our invention. Among these are benzene derivatives such as aniline, o-, m-, and p-toluidine, o-, m-, and p-anisidine, other alkoxyanilines such as the phenetidines and the butoxy anilines, other alkyl benzenes, such as the ethyl benzenes, the amyl benzenes, and the like; halogenated anilines such as the o-, m-, and p-chloroanilines; the nitrated anilines such as p-nitraniline; mixed types such as 3-chloro-4,6-dimethoxyaniline, 4-bromo-2-methoxyaniline, 4-chloro-2-methoxyaniline; aminoaryl ketones such as 2-aminoacetophenone, 4-aminoacetophenone, and 2, 3, or 4-aminobenzophenone; aminobenzaldehydes and aminobenzamides; sulfonated anilines such as sulfanilamide and derivatives thereof substituted on the amide group; aminophenols such as 4-aminophenol, 4-amino-2-methylphenol, 2-amino-3-methylphenol, or 3-amino-4-methylphenol; dialkylaminoanilines such as 4-dimethylaminoaniline, 4-dibutylaminoaniline and the like; aminosalicylic acid; aminobenzoic acid; and aminodiphenylamines such as 4-aminodiphenylamine. Amino derivatives of naphthalene are also usable, as e. g. alpha and beta naphthylamine; aminonaphthols such as 4-amino-1-napthol, 8-amino-1-naphthol, 1-amino-2-naphthol; and the like. Also usable are aminoheterocyclic derivatives such as aminopyridines (e. g. 2-aminopyridine, 3-aminopyridine, and 4-aminopyridine), aminoquinolines such as 2-aminoquinoline, 4-aminoquinoline, 6-aminoquinoline, or 8-aminoquinoline, aminothiophenes such as 2-aminothiophene, amino-azoles such as 2-aminothiazole, 2-aminobenzothiazole, 2-aminobenzoxazole, 2-amino-3-methoxydibenzofurane and the like, amino diazines such as 2-amino-pyrimidine, 2-aminomethylpyrimidine, and the like. Diamines can be used equally well to produce bis-amides. The diamines which can be used include such compounds as p-phenylenediamine, benzidine, tolidine, dianisidine, 3,3'-dichlorobenzidine, 4,4'-diaminostilbene, 4,4'-diphenylmethane, 4,4'-diaminobenzophenone, 4,4'-diaminoazobenzene, benzidine sulfone, and the like.

The resulting arylides may be converted into azoic coloring matters, by coupling with diazotized fast bases. These coloring matters may be produced in substance or on a substrate and used as pigments; or they may be prepared on textile materials according to the procedures commonly used for the production of ice colors. For example, cellulosic materials may be impregnated with an alkaline solution of an arylide of the present invention, and the cloth thus padded may be either dyed by immersion in a solution of a diazonium salt or printed with a paste containing such a salt in solution. Another method of utilizing the products of the present invention consists in mixing the arylide with a water-soluble diazo imino compound, alkali and thickener to form a printing paste, printing this paste upon the fiber and then exposing the print to the hot vapors of an organic acid, such as acetic or formic acid, to develop the colored pattern. Still another method comprises mixing the arylides with diazo sulfonates and an oxidizing agent, dissolving the mixture in dilute alkali, thickening with a suitable thickener, printing upon cellulose and developing the colored pattern on the fiber in the presence of weakly acidic vapors. The arylides of the present invention can be coupled with the diazonium salt of substantially any aromatic mono or diamine. Of particular interest are the aromatic amines, free from solubilizing substituents, such as the sulfonic and carboxylic acid groups, which are capable of being diazotized or tetrazotized and coupled to form azo dyestuffs. The following are some typical examples: aniline, its homologs, their halogen, nitro, alkoxy, aryloxy, acylamino, sulfone, sulfonamide, cyano derivatives, xenylamine, the naphthylamines, aminoazo compounds, benzidine, dianisidine, 4,4'-diaminostilbene and its derivatives and the like. Diamines containing only one diazotizable amino group, such as 2,6-dichloro-1,4-phenylenediamine, can be employed. If the aromatic amine contains more than one substituent, these may be either the same or different as, for example, in 2-methoxy-5-chloroaniline. The shades obtained are various shades of brown depending on the arylide and the diazo used. Where the amine used in preparing the arylide is substituted also by hydroxyl or similar groups, coupling may also take place in the arylide portion of the molecule.

The arylides of our invention may also be coupled with a diazotized aminosulfonic acid of the benzene or naphthalene series, to give rise to acid dyes, which may be converted, if desired, to pigment lakes of an alkali or alkaline earth metal such as sodium, potassium, barium, or calcium. Suitable diazo components for these uses are, for example, 2-chloro-5-aminotoluene-4-sulfonic acid, 2-naphthylamine-3,6-disulfonic acid, 1-naphthylamine-6-sulfonic acid, 1-naphthylamine-4,8-disulfonic acid, naphthionic acid and sulfanilic acid. These lakes can especially be made when the arylide used is prepared from amino acids such as amino-salicylic acids and the like.

The new dyes thus produced from the compounds of the present invention are not, however, claimed in the present application, constituting the subject matter of our application, Serial Number 248,655, filed September 27, 1951, now U. S. Letters Patent No. 2,675,376, which was copending with the parent application of this application, identified above.

While the new compounds of the present invention are claimed regardless of the method by which they are prepared, it is an advantage of the present invention that there are available a number of simple methods for the production of the new acids from which the arylides of the present invention are derived. Thus, for example, the 5-hydroxy benzotriazole-4-carboxylic acid may be produced by subjecting the corresponding 5-hydroxy-1,2,3-benzotriazole to the well known Kolbe reaction. The reaction proceeds smoothly and satisfactory yields of compounds are obtainable. Another method of preparing these compounds starts with 4-aminosalicylic acid, which is then converted into its ureide, aminated by coupling with a diazo compound and reducing. This serves to produce a compound having an amino group in the 5 position and an ureido group in position 4. This compound can then be cyclized to 5-hydroxy-1,2,3-benzotriazole-6-carboxylic acid by simple methods, which will be described in detail in the examples of the present application.

Our invention can be further illustrated by the following examples in which parts are by weight unless otherwise specified.

PREPARATION OF THE HYDROXYBENZOTRIAZOLE CARBOXYLIC ACIDS

Example 1

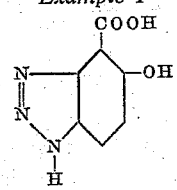

A nickel-lined, steel autoclave is charged with an intimate mixture of 20 parts of 5-hydroxy-1,2,3-benzotriazole, 95.5 parts of anhydrous potassium carbonate, and 115 parts of solid glass beads. The mixture is heated in the autoclave with open vent for 6 hours at 160–165° C. and then under 600 lbs. of carbon dioxide for 16 hours at 180–190°. The contents of the autoclave are then dissolved in 600 parts of water, decanted from the glass beads, heated with 5 parts of charcoal and 5 parts of siliceous filter aid, and filtered. The product separates on acidification. It can be purified by solution in sodium hydroxide followed by acidification to pH 6, filtration, and charcoal decolorization. On strong acidification the product separates and may be filtered and recrystallized from water. It melts at approximately 210° C. It couples with diazotized p-nitraniline in acid solution to give a bright reddish-orange product, and in alkaline solution to give a reddish-violet product.

Example 2

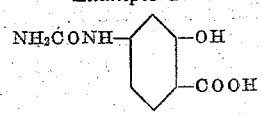

A solution of 16 parts of 4-aminosalicylic acid in 50 parts of water and 24 parts of 5 N sodium hydroxide solution is treated with 8.1 parts of potassium cyanate, and stirred until solution is complete. The resulting solution is cooled to 10–15° C., and carefully acidified with 5 N hydrochloric acid. The resulting thick white precipitate is heated to boiling to redissolve, treated with charcoal, filtered, cooled, and further acidified by additional hydrochloric acid. The product is filtered, and may be recrystallized from water. It melts at approximately 209° C.

Example 3

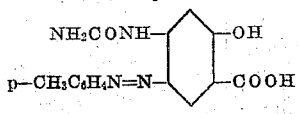

A solution of 38.6 parts of p-toluidine in 234 parts of 5 N hydrochloric acid and 500 parts of water is diazotized in the normal way at 2–3° C. with 5 N sodium nitrite solution. The resulting diazo solution is added with stirring to a solution of 84.5 parts of the above prepared 4-ureidosalicylic acid in 800 ml. of water and 260 parts of 5 N sodium hydroxide, additional sodium hydroxide being added as necessary to maintain strong alkalinity. The reaction mixture is diluted with 500 parts of water, acidified to pH 3 with hydrochloric acid after completion of the coupling, and filtered. The brown dye obtained is dried at 50° C.

Example 4

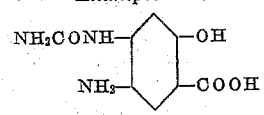

To 1000 parts of water and 118 parts of 5 N sodium hydroxide at 60° C., there is added 44.3 parts of the above prepared 5-(p-tolylazo)-4-ureidosalicylic acid and 50 parts of sodium hydrosulfite. The mixture is heated to 80° until practically colorless, held at this temperature approximately one-half hour longer, filtered hot, cooled to 30°, and washed with toluene. Removal of the p-toluidine is completed by adding to the aqueous solution 24 parts of 5 N sodium hydroxide solution, and repeating the toluene extraction. The washed solution is then cooled to 5° C. and acidified to precipitate the white product. The yield can be increased somewhat by salting. The product melts with decomposition in the range 235–240° C., charring at lower temperatures.

Example 5

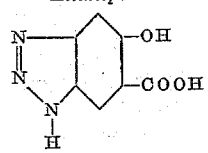

A solution of 4.2 parts of the above prepared 5-amino-4-ureidosalicylic acid in 100 parts of water and 30 parts of 5 N sodium hydroxide is treated with 16 parts of 5 N hydrochloric acid to precipitate the starting material in finely divided form. The resulting slurry is cooled to 10° C. and treated with approximately 150 parts of the 0.1 N sodium nitrite solution which is added as fast as it reacts. When the reaction is complete, as evidenced by a permanent excess of nitrite, the precipitate is filtered and dried. If desired, it may be purified by boiling with an equal weight of decolorizing charcoal in 100 times its weight in water, filtering, and acidifying with dilute hydrochloric acid. This material does not melt but gradually decomposes at temperatures in the range of 280° C. It couples with diazotized p-nitraniline in acid solution to give a yellowish-orange product, and in alkaline solution to give a deep bluish-violet product.

MONOARYLIDES OF 5-HYDROXY-BENZOTRIAZOLE-4-CARBOXYLIC ACID

Example 6

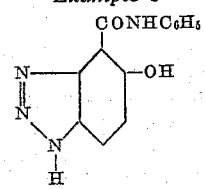

A solution of 2.55 parts of the above prepared 5-hydroxy-1,2,3-benzotriazole-4-carboxylic acid in 110 parts of chlorobenzene is dried by distilling out 5 parts of solvent, treated with 1.89 parts of aniline, and cooled to 70° C. There is then gradually added at this temperature a solution of 0.85 part phosphorus trichloride in 50 parts of chlorobenzene. The mixture is heated to 130–135° C., and the reaction completed by refluxing until evolution of hydrogen chloride ceases. The resulting solution is cooled to room temperature, filtered, and extracted with aqueous sodium hydroxide. The product separates on acidification and is filtered. If desired, it can be crystallized from alcohol, and melts at approximately 188° C.

This arylide couples in alkaline solution with diazotized p-nitroaniline to give a dark reddish-brown dye, soluble in caustic alkali and reprecipitated by acetic acid. Diazotized 2,5-dichloroaniline gives an alkali-soluble brownish-orange dye.

*Example 7*

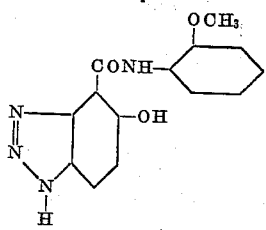

This compound is prepared in excellent yield from o-anisidide by the procedure of Example 6. It may be crystallized from alcohol. The pure material melts at approximately 215° C.

*Example 8*

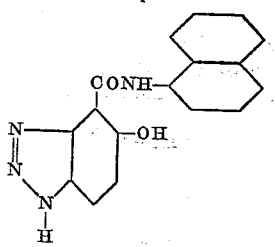

Prepared by the above described procedure, and crystallized from alcohol, this product melts at approximately 214° C. A similar product is obtained by the use of betanaphthylamine.

*Example 9*

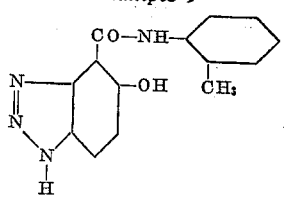

The procedure of Example 6 is followed using equivalent parts of o-toluidine in place of aniline. The product is similar to that of Example 6.

*Example 10*

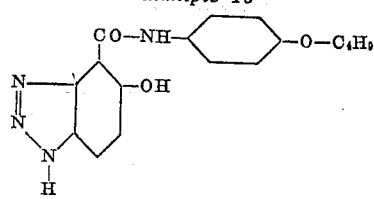

The procedure of Example 6 is followed using equivalent parts of p-butoxyaniline in place of aniline. The product is similar to that of Example 6.

*Example 11*

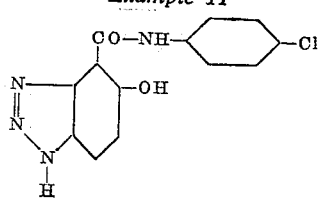

The procedure of Example 6 is followed using equivalent parts of p-chloraniline in place of aniline. The product is similar to that of Example 6.

*Example 12*

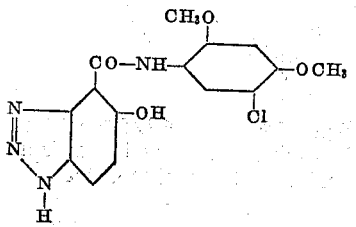

The procedure of Example 6 is followed using equivalent parts of 3-chloro-4,6-dimethoxyaniline in place of aniline. The product is similar to that of Example 6.

*Example 13*

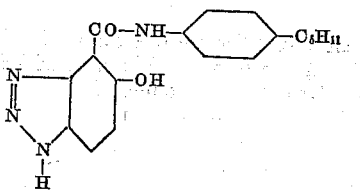

The procedure of Example 6 is followed using equivalent parts of p-amylaniline in place of aniline. The product is similar to that of Example 6.

*Example 14*

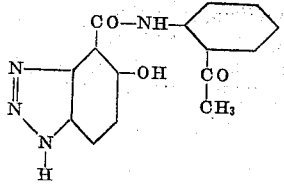

The procedure of Example 6 is followed using equivalent parts of o-aminoacetophenone in place of aniline. The product is similar to that of Example 6.

*Example 15*

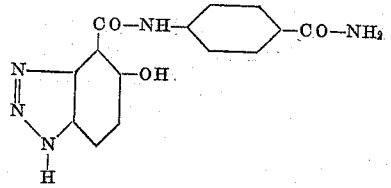

The procedure of Example 6 is followed using equivalent parts of p-aminobenzamide in place of aniline. The product is similar to that of Example 6.

*Example 16*

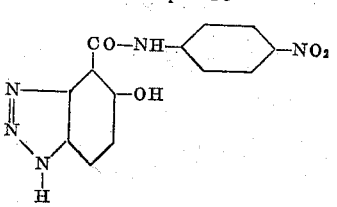

The procedure of Example 6 is followed using equivalent parts of p-nitraniline in place of aniline. The product is similar to that of Example 6.

Example 17

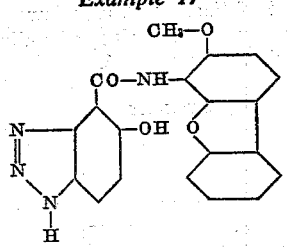

The procedure of Example 6 is followed using equivalent parts of 4-amino-3-methoxy-dibenzofurane in place of aniline. The product is similar to that of Example 6.

Example 18

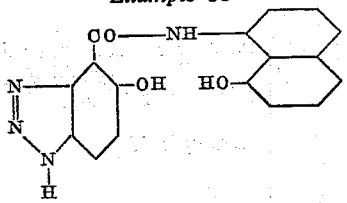

The procedure of Example 6 is followed using equivalent parts of 8-amino-1-naphthol in place of aniline. The product is similar to that of Example 6.

Example 19

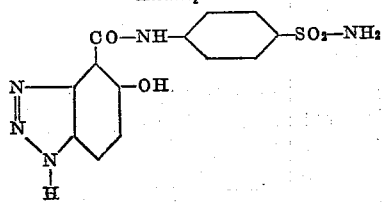

The procedure of Example 6 is followed using equivalent parts of sulfanilamide in place of aniline. The product is similar to that of Example 6.

ARYLIDES OF 5-HYDROXYBENZOTRIAZOLE-6-CARBOXYLIC ACID

Example 20

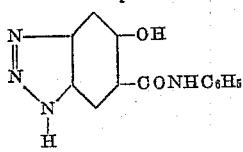

The procedure described above is followed, using 490 parts of dry chlorobenzene, 13.5 parts of aniline, and 17.9 parts of 5-hydroxy-1,2,3-benzotriazole-6-carboxylic acid. An excellent yield of product is obtained. It may be purified by dissolving in hot dilute caustic, treating with decolorizing charcoal, filtering, and acidifying. It decomposes at approximately 253° C.

Example 21

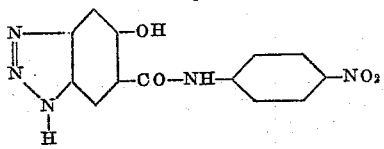

The procedure of Example 20 is followed using an equivalent amount of p-nitraniline instead of aniline. The product is similar to that of Example 20.

Example 22

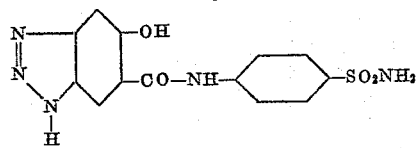

The procedure of Example 20 is followed using an equivalent amount of sulfanilamide instead of aniline. The product is similar to that of Example 20.

Example 23

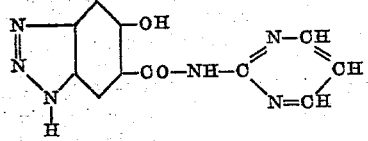

The procedure of Example 20 is followed using an equivalent amount of 2-amino-1,3-diazine instead of aniline. The product is similar to that of Example 20.

Example 24

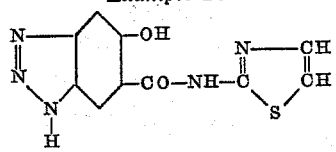

The procedure of Example 20 is followed using an equivalent amount of 2-aminothiazole instead of aniline. The product is similar to that of Example 20.

Example 25

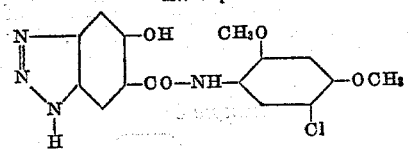

The procedure of Example 20 is followed using an equivalent amount of 3-chloro-4,6-dimethoxy aniline instead of aniline. The product is similar to that of Example 20.

Example 26

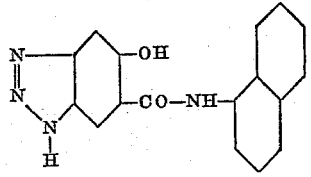

The procedure of Example 20 is followed using an equivalent amount of alpha naphthylamine instead of aniline. The product is similar to that of Example 20.

Example 27

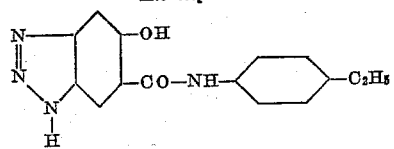

The procedure of Example 20 is followed using an equivalent amount of p-ethylaniline instead of aniline. The product is similar to that of Example 20.

Example 28

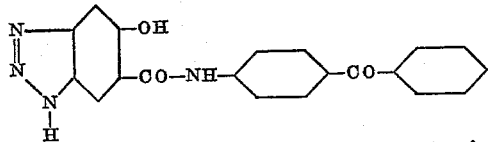

The procedure of Example 20 is followed using an equivalent amount of 4-aminobenzophenone instead of aniline. The product is similar to that of Example 20.

ARYLIDES OF DIAMINES

Example 29

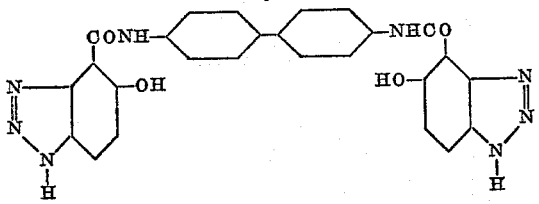

This product is prepared by the above described procedures. It shows no melting point up to 300° C.

Example 30

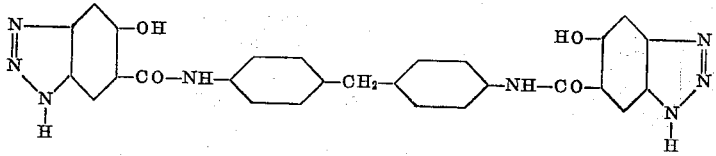

By following the procedure of Example 29, using an equivalent amount of 4,4′-diaminodiphenylmethane instead of benzidine, the resulting amide is prepared. Its properties resemble those of the product of Example 29.

Example 31

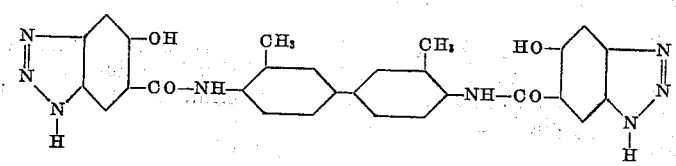

By following the procedure of Example 29, using an equivalent amount of tolidine instead of benzidine, the resulting amide is prepared. Its properties resemble those of the product of Example 29.

Example 32

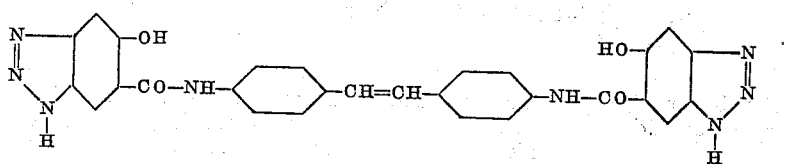

By following the procedure of Example 29, using an equivalent amount of 4,4′-diaminostilbene instead of benzidine, the resulting amide is prepared. Its properties resemble those of the product of Example 29.

Example 33

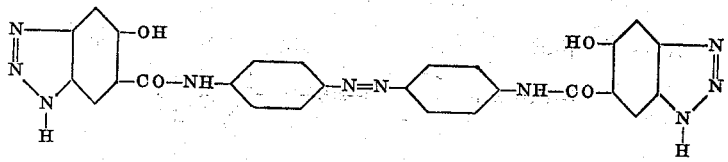

By following the procedure of Example 29, using an equivalent amount of 4,4′-diaminoazobenzene instead of benzidine, the resulting amide is prepared. Its properties resemble those of the product of Example 29.

Example 34

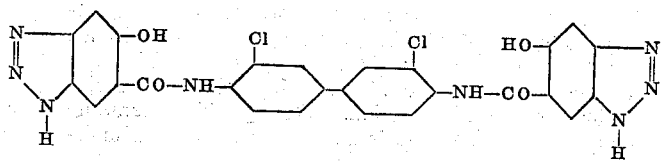

By following the procedure of Example 29, using an equivalent amount of 3,3′-dichlorobenzidine instead of benzidine, the resulting amide is prepared. Its properties resemble those of the product of Example 29.

Example 35

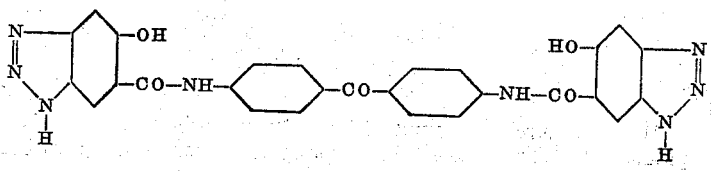

By following the procedure of Example 29, using an equivalent amount of 4,4'-diaminobenzophenone instead of benzidine, the resulting amide is prepared. Its properties resemble those of the product of Example 29.

*Example 36*

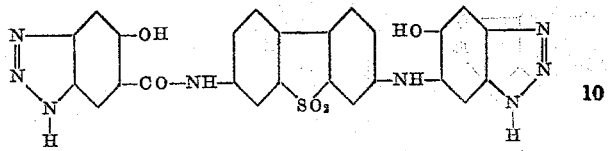

By following the procedure of Example 29, using an equivalent amount of 3,8-diaminodibenzothiophene-1,1'-dioxide instead of benzidine, the resulting amide is prepared. Its properties resemble those of the product of Example 29.

*Example 37*

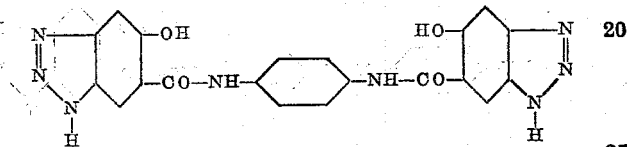

By following the procedure of Example 29, using an equivalent amount of p-phenylenediamine instead of benzidine, the resulting amide is prepared. Its properties resemble those of the product of Example 29.

DYES DERIVED FROM THE ARYLIDES

*Example 38*

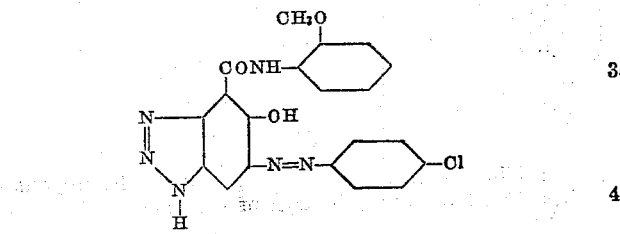

p-Chloroaniline (2.6 parts) is diazotized in the ordinary way with hydrochloric acid and sodium nitrite, and added with stirring to a solution of 6.0 parts of the above prepared 5-hydroxy-1,2,3-benzotriazole-4-carboxy-o-anisidide in 400 parts of water, 40 parts by volume of molar sodium hydroxide and 20 parts by volume of molar sodium carbonate solution. During this operation, more sodium carbonate is added as necessary to maintain alkalinity to phenolphthalein. The brown dye which is produced is acidified, filtered, washed, and dried at 100°.

*Example 39*

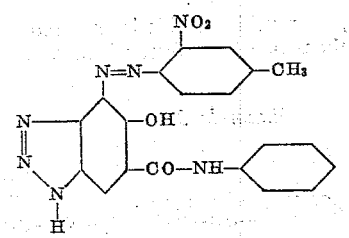

The procedure of Example 38 is followed using the product of Example 20 as the coupling component and 2-nitro-p-toluidine as the diazo component. A brown dye is obtained. By padding cotton cloth with the diazonium salt and then treating the cloth with a solution of the benzotriazole carboxarylide, dyeings of various shades of brown are obtained.

*Example 40*

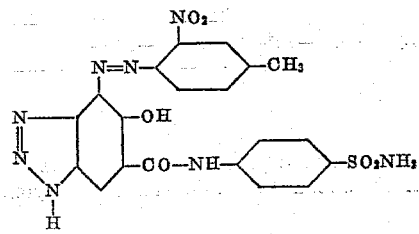

The procedure of Example 38 is followed using the product of Example 22 as the coupling component and 2-nitro-p-toluidine as the diazo component. A brown dye is obtained.

*Example 41*

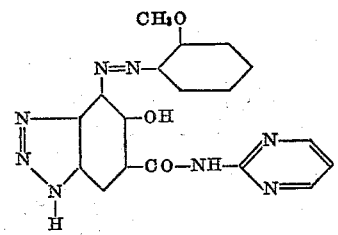

The procedure of Example 38 is followed using the product of Example 23 as the coupling component and o-anisidine as the diazo component. A brown dye is obtained.

*Example 42*

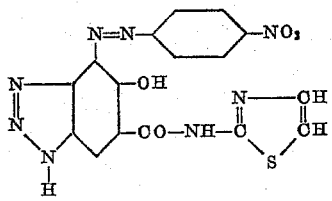

The procedure of Example 38 is followed using the product of Example 24 as the coupling component and p-nitraniline as the diazo component. A brown dye is obtained.

*Example 43*

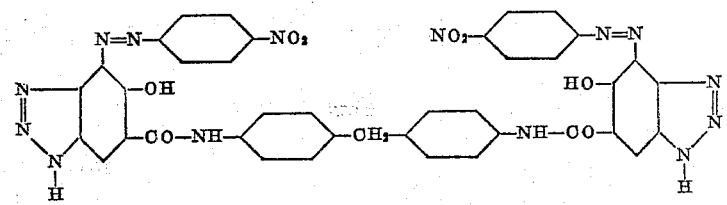

The procedure of Example 38 is followed using the product of Example 30 as the coupling component and p-nitraniline as the diazo component. A brown dye is obtained.

We claim:

1. Aromatic amides of 5-hydroxybenzo-1,2,3-triazole carboxylic acids in which the carboxylic group is bound to a carbon adjacent to that to which the hydroxyl group is bound, the aromatic group in said aromatic amide portion of the molecule, being free of carboxylic and sulfonic acid groups, said aromatic group having at least half its carbons as aromatic carbons, and the said aromatic group having no more than three fused rings.

2. Compounds of claim 1 derived from monoamines.

3. Compounds of claim 2 in which the monoamine is carbocyclic.

4. Compounds of claim 3 in which the amine has a six-membered mononuclear ring.

5. Compounds of claim 3 in which the amine is polynuclear.

6. Aromatic amides of 5-hydroxybenzo-1,2,3-triazole-4-carboxylic acid, the aromatic group in said aromatic amide portion of the molecule, being free of carboxylic and sulfonic acid groups, said aromatic group having at least half its carbons as aromatic carbons, and the said aromatic group having no more than three fused rings.

7. Aromatic amides of 5-hydroxybenzo-1,2,3-triazole-6-carboxylic acid, the aromatic group in said aromatic amide portion of the molecule, being free of carboxylic and sulfonic acid groups, said aromatic group having at least half its carbons as aromatic carbons, and the said aromatic group having no more than three fused rings.

8. Compounds of claim 2 in which the amine is heterocyclic.

9. Compounds of claim 1 derived from diamines.

10. Compounds of claim 9 in which the diamine is a 4,4'-diaminodiphenyl.

11. Compounds of claim 10 in which the hydroxybenzotriazole carboxylic acid is 5-hydroxybenzo-1,2,3-triazole-4-carboxylic acid.

12. Compounds of claim 10 in which the hydroxybenzotriazole carboxylic acid is 5-hydroxybenzo-1,2,3-triazole-6-carboxylic acid.

13. Compounds of claim 9 in which the amino groups are bound to different rings, said rings being separated by non-aromatic atomic chains of less than three atoms.

14. Compounds of claim 4 in which the hydroxybenzotriazole carboxylic acid is 5-hydroxybenzo-1,2,3-triazole-4-carboxylic acid.

15. Compounds of claim 4 in which the hydroxybenzotriazole carboxylic acid is 5-hydroxybenzo-1,2,3-triazole-6-carboxylic acid.

16. 5-hydroxybenzo-1,2,3-triazole-4-carboxanilide.

17. 5-hydroxybenzo-1,2,3-triazole-6-carboxanilide.

18. 2[5-hydroxybenzo - 1,2,3 - triazole-6-carboxamido] thiazole.

19. 4,4'-bis[5-hydroxybenzo - 1,2,3 - triazole-4-carboxamido] diphenyl.

20. 4,4'-bis[5-hydroxybenzo - 1,2,3 - triazole-6-carboxamido] diphenylmethane.

References Cited in the file of this patent

UNITED STATES PATENTS 2,675,376   Scalera et al. _____ Apr. 13, 1954

OTHER REFERENCES

Scalera et al.: J. A. C. S., vol. 75, pp. 715–18 (1953).